3,325,532
MANUFACTURE OF ADIPONITRILE
John Derek Rushton and Richard Anthony Williams, Manchester, England, assignors to Imperial Chemical Industries Limited, London, England, a corporation of Great Britain
No Drawing. Filed Aug. 7, 1964, Ser. No. 388,315
Claims priority, application Great Britain, Aug. 15, 1963, 32,345/63
2 Claims. (Cl. 260—465.2)

This invention relates to the manufacture of adiponitrile and more particularly it relates to a process for the separation of adiponitrile from the mixed products of the high temperature reaction of adipic acid and ammonia.

Adiponitrile may be manufactured by passing a mixture of adipic acid vapour and ammonia gas over a suitable catalyst at a high temperature, for example a temperature within the range 350° C. to 400° C. It is usual to use an excess of ammonia in order to ensure the maximum conversion of adipic acid. The reaction product then normally consists of adiponitrile, water and excess ammonia, together with by-products, in the form of the mixed vapours. It has hitherto been the practice to pass the product vapours to a condenser in which they are reduced in temperature to about 50° C. so that the adiponitrile and the water, and the bulk of the by-products, are condensed out as a liquid, and the excess ammonia passes through the condenser as a vapour and is subsequently absorbed in water. The liquid product from the condenser, consisting mainly of adiponitrile and water, separates into two phases, namely an aqueous phase consisting essentially of a solution of between about 5% and 10% of adiponitrile in water, and an oil phase consisting essentially of adiponitrile and by-products containings about 10% of dissolved water. The two phases are then separated. Since there is only a slight difference between the densities of the two phases separation tends to be a troublesome operation. Adiponitrile is then obtained by distilling each of the phases separately. Owing to the low adiponitrile content (between 5% and 10%) of the aqueous phase a relatively large amount of heat energy has to be expended in order to obtain a given quantity of adiponitrile from the aqueous phase by first distilling off the water.

We have now found that adiponitrile may be separated directly from the mixed products of the high temperature reaction of adipic acid and ammonia.

According to our invention we provide a process for the separation of adiponitrile from the mixed products of the high temperature reaction of adipic acid and ammonia which comprises feeding the said mixed products as a vapour to the base of a fractionating column, feeding water or an aqueous ammonia solution to the upper part of the fractionating column and withdrawing adiponitrile as a liquid from the base of the fractionating column.

In the process of our invention the reaction product vapours, consisting of a mixture of adiponitrile, water, ammonia and by-products, are fed from the reaction vessel to the base of a fractionating column at a high temperature which may not be substantially less than the temperature at which the reaction has been carried out. Conveniently an aqueous ammonia solution is fed to the upper part of the fractionating column but water may be employed instead of or as well as aqueous ammonia if desired. The hot vapours ascending through the column meet the relatively cool aqueous stream descending through the column. As a result of heat interchange between the components in the liquid and vapour phases the adiponitrile and the higher boiling by-products are condensed to liquids, and the descending aqueous stream is vapourised and passes out of the top of the column together with the water vapour and ammonia gas in the reaction product vapours. The liquid condensed in the column, a single phase consisting essentially of adiponitrile and by-products and containing very little water, is withdrawn from the base of the column as a tails fraction.

By condensing the mixed water vapour and ammonia gas which passes from the top of the fractionating column aqueous ammonia is obtained which may if desired be returned to the upper part of the fractionating column with or without the addition of water. Alternatively water alone may be fed to the column in place of aqueous ammonia. If only a part of the condensate is fed to the fractionating column, the remaining aqueous ammonia solution can be used for the recovery of ammonia. The proportion of water or aqueous ammonia solution which is fed to the column depends on the degree of cooling which it is desired to apply to the reaction product vapours, and it is convenient to adjust the proportion according to the temperature of the column by means of a suitable system of temperature controlled valves. Usually condensation of adiponitrile inside the fractionating column is substantially completely and very little adiponitrile leaves the column along with the aqueous ammonia vapour.

The process of our invention may be operated in any convenient type of fractionating column. We prefer, however, to use a fractionating column consisting of six valve trays.

Within the conditions imposed by the process itself the operating conditions of the fractionating column are not critical. We prefer, however, to feed the reaction product vapours to the base of the column at a temperature of from 300° to 400° C. and preferably at about 350° C. and to feed water or aqueous ammonia solution to the upper port of the column at about 50° C. Under these conditions the liquid adiponitrile condensate withdrawn from the base of the column is at a temperature between about 180° C. and 250° C. and the mixed water vapour and ammonia gas passing from the top of the column are at a temperature between about 70° C. and 80° C. The vapours passing from the top of the column usually contain a negligible proportion of adiponitrile (less than 0.1%), but they may contain a small proportion of lower-boiling by-products, for example cyclopentanone. The aqueous ammonia solution which is withdrawn from the condenser usually has a strength of approximately 20%.

Compared with the process operated hitherto the process of our invention offers a number of advantages. Thus the adiponitrile is obtained as a single fraction of low water content instead of as two phases one of which is mainly aqueous and the other contains a significant amount of water. The troublesome separation of two phases is therefore avoided, and the necessity for separating adiponitrile from water in each of the phases by distillation is also avoided, thereby affecting a significant saving in the heat energy required.

A preferred embodiment of the process is described in the following example:

*Example*

Adiponitrile was manufactured by passing 1700 lb./hr. adipic acid vapour and 1800 lb./hr. ammonia gas over a dehydrating catalyst. The product vapours consisting of adiponitrile vapour, ammonia gas, steam and smaller quantities of organic by-products, were delivered to the base of the product fractionator at approximately 350° C.

The fractionator comprised a 2 ft. diameter fractionating column fitted with six Glitsch valve trays spaced 18 inches apart. The overhead vapours from the column were delivered to a condenser arranged to return reflux to the column top and distillate to a receiver.

The operating conditions were as follows:

| | |
|---|---|
| Vapour feed to column lb./hr | 3500 |
| Reflux to column do | 900–1100 |
| Tails from column do | 1200–1300 |
| Aqueous ammonia make (16–17% ammonia) do | 800–900 |
| Temperatures: | |
| Fractionator base temperature °C | 235–245 |
| Fractionator head temperature do | 75–80 |
| Reflux temperature do | 60 |
| Analyses: | |
| Water in column tails percent w./w | 0.2–0.5 |
| $NH_3$ in column tails do | 0.03–0.10 |
| Adiponitrile in column tails do | 92–95 |
| Oil in distillate (mainly adiponitrile) do | 0.02–0.12 |
| Ammonia in distillate and reflux do | 16–17 |

What we claim is:

1. Process for the separation of adiponitrile from the mixed products of the high temperature reaction of adipic acid and ammonia which comprises feeding the said mixed products as a vapor having a temperature of from 300° C. to 400° C. into the base of a fractionating column, feeding water or an aqueous ammonia solution to a part of the fractionating column which is above the feed of said mixed products, so that the water or aqueous ammonia solution descends through said column and contacts the vapor fed thereto whereby said adiponitrile is condensed and water is vaporized, removing the vaporized water from the top of the column and withdrawing the condensed adiponitrile as a liquid from the base of the fractionating column.

2. Process according to claim 1 wherein vaporized water removed from the top of the column is condensed to produce an aqueous ammonia solution and said aqueous ammonia solution is returned as a feed to that part of the fractionating column which is above the feed of the said mixed products.

No references cited.

CHARLES B. PARKER, *Primary Examiner.*

JOSEPH P. BRUST, *Assistant Examiner.*